United States Patent [19]

Hirai

[11] 4,165,518

[45] Aug. 21, 1979

[54] VIDEO SIGNAL RECORDING AND/OR REPRODUCING APPARATUS

[75] Inventor: Jun Hirai, Yokohama, Japan

[73] Assignee: Sony Corporation, Tokyo, Japan

[21] Appl. No.: 770,315

[22] Filed: Feb. 18, 1977

[30] Foreign Application Priority Data

Mar. 1, 1976 [JP] Japan ................................. 51-21997

[51] Int. Cl.² .......................... H04N 5/76; G11B 5/04; H04L 7/00
[52] U.S. Cl. .......................................... 358/8; 360/33; 360/30
[58] Field of Search .................... 358/4, 8; 360/20, 30, 360/33, 19

[56] References Cited

U.S. PATENT DOCUMENTS

| | | | |
|---|---|---|---|
| 3,918,085 | 11/1975 | Numakura et al. | 358/4 |
| 3,925,810 | 12/1975 | Ishigaki et al. | 358/4 |
| 3,925,816 | 12/1975 | Kihara | 360/19 |
| 3,968,514 | 7/1976 | Narahara et al. | 358/4 |
| 4,007,482 | 2/1977 | Amari | 358/4 |
| 4,007,484 | 2/1977 | Amari | 358/4 |
| 4,010,490 | 3/1977 | Ota | 358/4 |
| 4,012,771 | 3/1977 | Ishigaki et al. | 358/4 |

*Primary Examiner*—Robert L. Griffin
*Assistant Examiner*—Aristotelis M. Psitos

*Attorney, Agent, or Firm*—Lewis H. Eslinger; Alvin Sinderbrand

[57] ABSTRACT

In apparatus for recording and/or reproducing video signals in successive parallel tracks on a record medium, and in which at least a portion of the video signals, for example, the luminance component of color video signals, is recorded as a frequency modulation on a carrier, the carrier of the frequency modulated portion of the video signals, as recorded in tracks that are next adjacent to each other, has different first and second carrier frequencies, respectively, which are in frequency interleaving relation to each other for minimizing cross-talk when reproducing the signals thus recorded. The shifting of the carrier frequency for the frequency modulated luminance component is conveniently achieved by selectively applying different first and second bias voltages to the luminance component as supplied to a frequency modulator, with the difference between such bias voltages being effective in the modulator to establish the desired difference between the carrier frequencies. On reproducing, the frequency modulated luminance component is demodulated, and changes in level of the demodulated luminance component corresponding to the different carrier frequencies with which the frequency modulated luminance component was recorded in next adjacent tracks, respectively, are eliminated, for example, by selectively applying suitably different bias voltages to the demodulated luminance component.

68 Claims, 15 Drawing Figures

VIDEO SIGNAL RECORDING AND/OR REPRODUCING APPARATUS

BACKGROUND OF THE INVENTION

1. Field of the Invention

This invention relates generally to an apparatus for recording and/or reproducing video signals, and more particularly is directed to an apparatus for recording the video signals in successive parallel tracks on a magnetic tape or other record medium with a high recording density and for reproducing the recorded video signals with cross-talk from signals recorded in adjacent tracks being eliminated or at least minimized.

2. Description of the Prior Art

It is well known to record video signals on a magnetic tape or other record medium by scanning successive parallel tracks on the record medium with one or more transducers energized by the video signals. In effecting such recording of video signals, it has been the usual practice to provide guard bands or unrecorded gaps between the successive parallel tracks so that, when a transducer scans one of the tracks for reproducing the signals recorded therein, such transducer will not also reproduce cross-talk, that is, signals recorded in the adjacent tracks. However, the provision of guard bands between the successive parallel tracks reduces the recording density, that is, the amount of signal information recorded on a unit area of the record medium, and thus does not permit the efficient utilization of the record medium for the recording of video signals.

One effort made to minimize cross-talk while permitting an increase in the recording density has been to use two transducers having air gaps with different azimuth angles for recording and reproducing signals in the next adjacent or alternate tracks, respectively. This is relatively easy to do because apparatus for magnetically recording and/or reproducing video signals usually includes a rotary guide drum provided with two alternately operative transducers or heads which can have air gaps with different azimuth angles. The tape is wrapped helically about a portion of the perimeter of the drum and is moved longitudinally while the transducers or heads are rotated, thus causing the heads alternately to scan respective tracks for recording or reproducing signals therein. Each transducer or head, in the recording operation of the apparatus, effects magnetization of magnetic domains in the magnetic coating on the tape in what would appear to be, if such domains were visible, a series of parallel lines or stripes each having a length as great as the width of the track, and each having an orientation that corresponds to the azimuth angle of the gap of the respective transducer or head. In the reproducing or playback operation of the apparatus, each track is scanned by the transducer or head having its gap aligned with the parallel, but fictitious, lines of that track, from which it follows that the gap of the transducer or head scanning a track for reproducing the video signals recorded therein extends at an angle to mentioned fictitious lines of the tracks next adjacent to the track being scanned. By reason of the foregoing, if a transducer or head in scanning a track for reproducing the video signals recorded therein overlaps an adjacent track or otherwise reproduces signals recorded in the latter, the well-known azimuth loss would result in attenuation of the signals reproduced from the adjacent track.

It is also well known that, in recording video signals as described above, it is advantageous to record at least a portion of the video signals as a frequency modulation on a carrier having a relatively high frequency. Since the previously mentioned azimuth loss is generally proportional to the frequency of the signals, such azimuth loss is relatively effective to decrease or eliminate the cross-talk from adjacent tracks in respect to the frequency modulated portion of the video signals recorded in the tracks. Thus, insofar as the frequency modulated portion of the recorded video signals is concerned, it is possible to record the video signals in abutting or even partially overlapping successive parallel tracks, that is, without providing guard bands between the adjacent tracks on the record medium.

Although the elimination of the guard bands substantially increases in the recording density, any further increase in the recording density, and hence in the amount of video signal information or playing time that can be accommodated on a given length of the magnetic tape, can be achieved only by reducing the width of the successive parallel tracks. However, the degree of azimuth loss is inversely proportional to the width of the tracks. Therefore, if the width of the tracks is reduced to less than a predetermined value, the interference due to cross-talk between video signals reproduced from adjacent tracks is not eliminated or sufficiently minimized by the use of transducers or heads having different azimuth angles. It will be apparent that, if the magnitude of the cross-talk signals being reproduced by a transducer or head from tracks adjacent the track being scanned thereby is not sufficiently small in relation to the magnitude of the video signals reproduced by the head from the scanned track, an interference or beat signal with a frequency different from that of the video signals reproduced from the scanned track and the cross-talk signals will appear as a beat or moire pattern on the image or picture displayed by the cathode ray tube.

It is the usual practice to record video signals with a so-called H-alignment so as to avoid interference or cross-talk between the horizontal synchronizing and blanking signals included in the video signals recorded in the successive parallel tracks. In recording video signals with H-alignment, the ends of the margins between the successive areas in which line intervals are recorded in each track are aligned, in the direction transverse to the lengths of the tracks, with the adjacent ends of the margins between the successive areas in which line intervals are recorded in the next adjacent tracks. However, it is not possible to record the video signals with H-alignment at all tape speeds. For example, if the video signals are recorded with H-alignment when the tape is longitudinally driven or transported at a predetermined speed, the signals will not be recorded with H-alignment when the tape is transported at one-half such predetermined speed. In that case, the level of the interfering signal or cross-talk will become high, for example, when a head or transducer, when reproducing picture information from a track being scanned, simultaneously reproduces a horizontal synchronizing signal as cross-talk from an adjacent track, so that there is a relatively great frequency difference between the cross-talk and the video signal picture information being reproduced from the scanned track. Thus, once again, a beat or moire pattern will appear on the image or picture displayed by the cathode ray tube.

When recording color video signals which include a luminance component and a chrominance component, it is known to separate such components and then to frequency modulate the luminance component on a carrier having a relatively high frequency, while the chrominance component is frequency converted so as to have its frequency band shifted below the frequency band of the frequency modulated luminance component, whereupon the frequency modulated luminance component and the frequency converted chrominance component are combined to provide composite video signals which are recorded in the successive parallel tracks. However, since the azimuth loss is generally proportional to the frequency of the signals, as previously mentioned, interference due to cross-talk from the low frequency or frequency converted chrominance component is not reduced to the same degree by the use of transducers having different azimuth angles as cross-talk from the high frequency or frequency modulated luminance component. Thus, when recording color video signals, it has been proposed, for example, as disclosed in detail in U.S. Pat. Nos. 4,007,482 and 4,007,484, issued Feb. 8, 1977, and each having a common assignee herewith, to reduce or eliminate interference or cross-talk between low frequency signals recorded in adjacent tracks by recording the chrominance component with different first and second carriers in such adjacent tracks, respectively. The first and second carriers modulated by the chrominance component for recording in adjacent tracks, respectively, may be distinguished from each other by their respective polarity characteristics so that, when a head scans a particular track for reproducing the video signals recorded therein, the chrominance component of cross-talk signals from the tracks next adjacent to the scanned track can be conveniently suppressed or eliminated by reason of the different polarity characteristics of the carriers with which the chrominance component was recorded in the scanned track and in the tracks adjacent thereto, respectively. Although the foregoing scheme effectively eliminates interference or cross-talk in respect to the chrominance component while permitting a high recording density to be achieved by eliminating guard bands between the tracks and reducing the width of the latter, the previously mentioned limitations on the reduction of the width of the tracks still apply in respect to the frequency modulated luminance component of the recorded color video signals in that, as to such frequency modulated luminance component, the elimination of interference or cross-talk still depends upon the use of transducers or heads having different azimuth angles for recording the video signals in the next adjacent tracks.

OBJECTS AND SUMMARY OF THE INVENTION

Accordingly, it is an object of this invention to provide an apparatus for recording and/or reproducing video signals in successive parallel tracks with a high recording density achieved by elimination of guard bands between the tracks and reduction of the width of the latter while avoiding, or at least minimizing interference or cross-talk when reproducing the video signals recorded in such tracks.

Another object is to provide an apparatus for recording and/or reproducing color video signals in successive parallel tracks on a record medium with a high recording density achieved by the elimination of guard bands between the record tracks and the reduction of the width of the latter, while avoiding or at least substantially minimizing interference or cross-talk in respect to the luminance component as well as the chrominance component of the recorded color video signals when reproducing the latter.

In accordance with an aspect of this invention, in an apparatus for recording and/or reproducing video signals in successive parallel tracks on a record medium, and in which at least a portion of the video signals is recorded as a frequency modulation on a carrier, the carrier of the frequency modulated portion of the video signals, as recorded in tracks that are next adjacent to each other, is provided with different first and second carrier frequencies, respectively, which carrier frequencies are in frequency interleaving relation to each other. The shifting of the carrier frequency for the frequency modulated portion of the recorded video signals is conveniently achieved by selectively applying different first and second bias voltages to such portion of the video signals as supplied to a frequency modulator, with the difference between the bias voltages being effective, in the modulator, to establish the desired difference between the carrier frequencies. On reproducing the recorded video signals, the frequency modulated portion thereof is demodulated, and changes in the level of the resulting demodulated signal corresponding to the different carrier frequencies with which the frequency modulated portion of the video signals was recorded in next adjacent tracks, respectively, are eliminated, for example, by selectively applying suitably different bias voltages to the demodulated signal.

When the present invention is applied to the recording and/or reproducing of color video signals, the luminance component of the color video signals is the portion thereof which is frequency modulated on a carrier having different carrier frequencies for recording in the next adjacent tracks, as described above, while the chrominance component of the color video signals is frequency converted to a lower frequency band than that of the frequency modulated luminance component and is provided with different carriers, for example, carriers having different polarity characteristics, for recording in the tracks that are next adjacent to each other.

The above, and other objects, features and advantages of this invention, will be apparent in the following detailed description of illustrative embodiments of the invention which is to be read in connection with the accompanying drawings.

DESCRIPTION OF THE PREFERRED EMBODIMENTS

Figure 1:
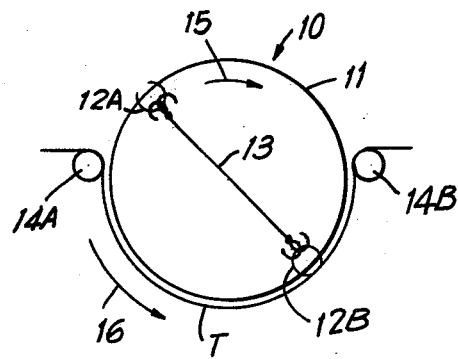
FIG. 1 is a schematic plan view of a rotary head assembly that is included in an apparatus for recording and/or reproducing video signals in accordance with this invention.
Figure 3:
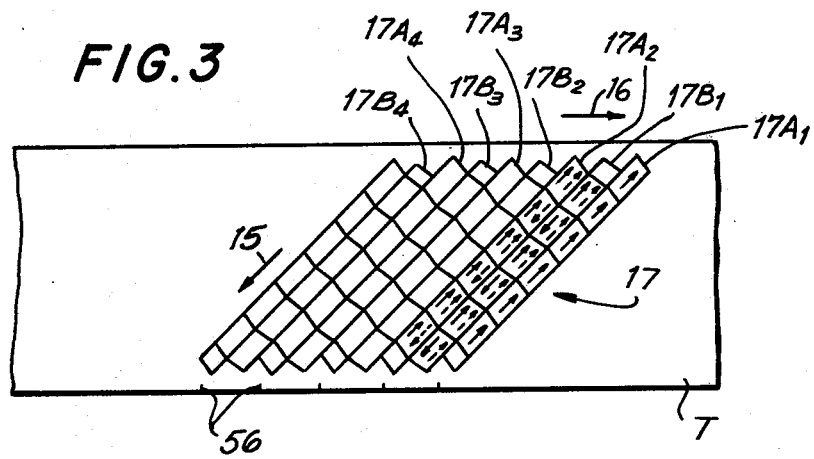
FIG. 3 is a schematic view of a portion of a magnetic tape and showing successive parallel tracks thereon in which video signals are recorded and/or reproduced in accordance with this invention.

Referring first to FIG. 1, it will be seen that, in recording and/or reproducing video signals on a magnetic tape T in accordance with this invention, use is of a rotary head assembly 10 that includes a guide drum 11 having a circumferential slot, and a pair of diametrically opposed transducers or heads 12A and 12B mounted at opposite ends of a rotary support arm 13 so as to move in a circular path along the circumferential slot of drum 11. The magnetic tape T is suitably guided, as by guide rollers 14A and 14B, in a helical path extending about a substantial portion of the periphery of drum 11. Thus, when support arm 13 is rotated in the direction of the arrow 15 and, simultaneously, tape T is suitably driven in the longitudinal direction indicated by the arrow 16, heads 12A and 12B alternately scan successive parallel tracks 17 extending across tape T at an angle to the longitudinal direction of the latter (FIG. 3). It will be appreciated that head 12A scans alternating tracks, for example, as indicated at $17A_1, 17A_2, 17A_3, 17A_4$—while head 12B scans the remaining alternating tracks indicated at $17B_1, 17B_2, 17B_3, 17B_4$—. Thus, if one considers any of the next adjacent tracks on tape T for example, the tracks $17A_1$ and $17B_1$, such tracks are respectively scanned by the heads 12A and 12B.

Usually, but not necessarily, each of tracks 17 has recorded therein the signal information corresponding to a respective field interval of the video signals, and each track is divided into successive areas or increments each having recorded therein the signal information corresponding to a line interval of the respective field of the video signals. Each line interval and each field interval of the video signals contains a blanking and synchronizing portion and, in accordance with accepted practice, the relative movements in the directions of the arrows 15 and 16 are preferably regulated in accordance with the synchronizing signals of the video signals to be recorded so as to obtain so-called H-alignment of the areas in which line intervals are recorded in each track with the areas in which line intervals are recorded in the next adjacent tracks. In other words, as shown schematically on FIG. 3, the ends of the margins between the areas in which the line intervals are recorded in each of the tracks 17 are preferably aligned, in the direction transverse to the lengths of the tracks, with the adjacent ends of such margins in the next adjacent tracks.

Figure 2A:
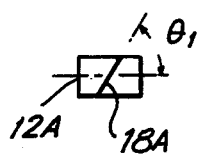
FIGS. 2A and 2B are schematic views illustrating the arrangement of the air gaps of heads or transducers included in the assembly of FIG. 1.
Figure 2B:
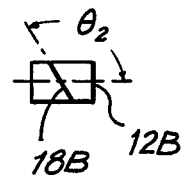

As shown schematically on FIGS. 2A and 2B, heads 12A and 12B have air gaps 18A and 18B, respectively, arranged at substantially different azimuth angles $\theta_1$ and $\theta_2$ in respect to the plane of rotation of heads 12A and 12B. By reason of the foregoing, each of heads 12A and 12B, when recording video signals in the respective tracks on tape T, effects magnetization of magnetic domains in the magnetic coating on tape T in what would appear to be, if such domains were visible, a series of parallel lines or stripes extending across the respective track and each having an orientation that corresponds to the azimuth angle $\theta_1$ or $\theta_2$ of the gap of the respective head 12A or 12B. When reproducing video signals thus recorded, each of tracks $17A_1–17A_4$ is scanned by head 12A and each of tracks $17B_1–17B_4$ is scanned by head 12B, from which it follows that the gape 18A or 18B of the head 12A or 12B, when scanning a track for reproducing the video signals recorded therein, extends at an angle to the previously mentioned fictitious lines of the tracks next adjacent to the track being scanned. By reason of the foregoing, if the head 12A or 12B in scanning one of the tracks 17A or 17B, respectively, for reproducing the video signals recorded therein overlaps an adjacent track 17B or 17A, respectively, or otherwise reproduces signals recorded in such adjacent track, the well-known azimuth loss causes attenuation of the signals reproduced from such adjacent track.

Figure 4:
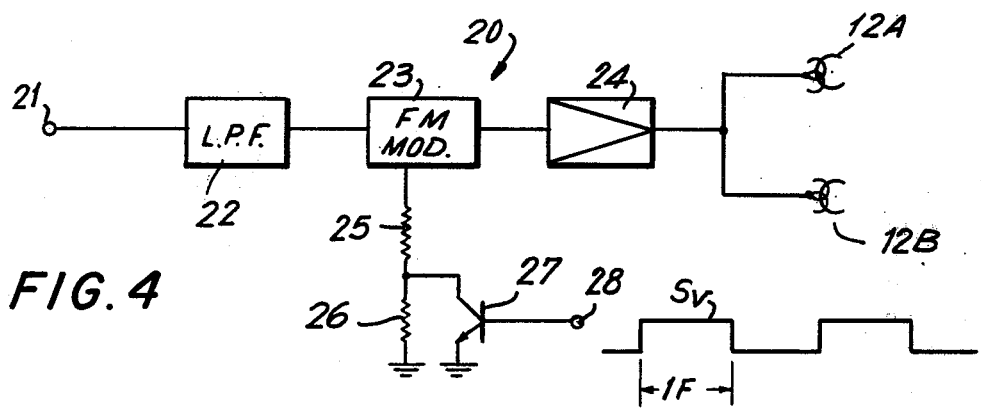
FIG. 4 is a block diagram illustrating a similified recording circuit incorporating an essential feature of this invention and through which video signals are supplied to the rotary head assembly of FIG. 1 for recording in successive parallel tracks on the magnetic tape as shown on FIG. 3.

Referring now to FIG. 4, it will be seen that, in a simplified or basic circuit 20 for recording video signals in accordance with this invention, the video signals to be recorded are applied through an input terminal 21 to a low pass filter 22, and the portion of the video signals passing through filter 22 is applied to a frequency modulator 23 for frequency modulating a relatively high frequency carrier. The frequency modulated portion of the video signals obtained at the output of modulator 23 is passed through a recording amplifier 24 to heads 12A and 12B so as to be recorded by the latter in alternate tracks on tape T as previously described with reference to FIGS. 1–3.

Generally, in accordance with this invention, means are provided for shifting the carrier frequency of the frequency modulated portion of the video signals issuing from modulator 23 between different first and second carrier frequencies which are in frequency interleaving to each other, and such means for shifting the carrier frequency is controlled so as to provide the frequency modulated portion of the video signals with the first carrier frequency whenever head 12A is operative to record the same in a respective track, for example, one of the tracks $17A_1–17A_4$ on FIG. 3, while the frequency modulated portion of the video signals is provided with the second carrier frequency whenever head 12B is operative to record the same in a respective track, for example, one of the tracks $17B_1–17B_4$ on FIG. 3. In other words, the frequency modulated portion of the video signals is recorded with the first carrier frequency in each of tracks $17A_1–17A_4$, and with the second carrier frequency in each of tracks $17B_1–17B_4$.

In the recording circuit 20 shown on FIG. 4, the means provided for shifting the carrier frequency of the frequency modulated portion of the video signals includes a voltage divider constituted by series-connected resistors 25 and 26 and a switching transistor 27 having its emitter-collector circuit connected in parallel with resistor 26 while the base electrode of transistor 27 is connected to a terminal 28 which receives a suitable square-wave control voltage $S_V$. The control voltage $S_V$ is suitably generated to provide positive and negative voltages alternately to the base electrode of transistor 27 during successive field intervals of the video signals being recorded. Since transistor 27 is shown to be of the NPN-type, transistor 27 is conductive during each field interval when control voltage $S_V$ is positive, and non-conductive during each field interval when control voltage $S_V$ is relatively negative. When transistor 27 is conductive during alternate field intervals, resistor 26 is substantially short-circuited thereby, and resistor 25 is effective to provide a first bias voltage for frequency modulator 23 which causes the latter to establish a respective first carrier frequency. On the other hand, when transistor 27 is non-conductive during alternate fields, resistors 25 and 26 are operative in series to provide a different or second bias voltage for modulator 23 so that the latter suitably establishes a different or second carrier frequency.

Figure 5:
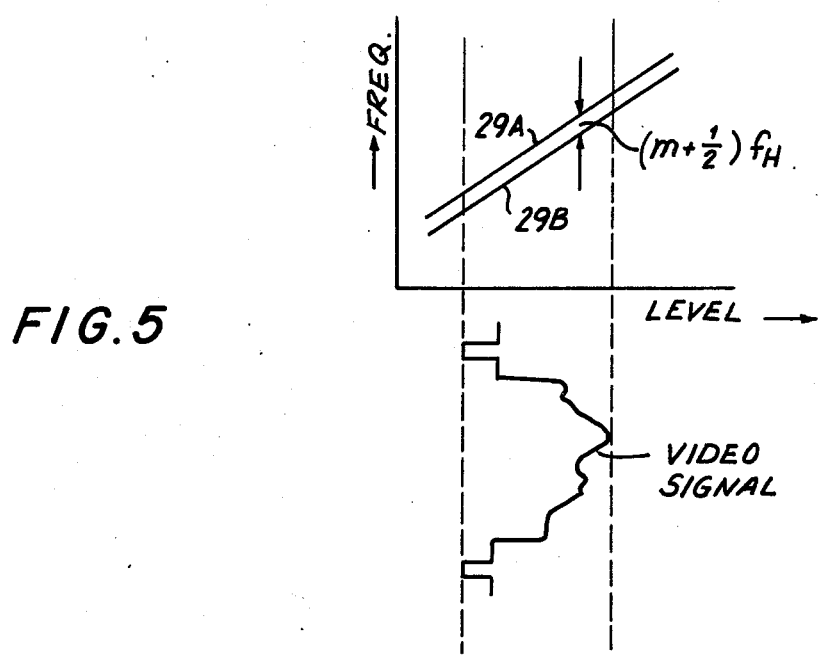
FIG. 5 is a graph to which reference will be made in explaining the operation of the recording circuit of FIG. 4.

The frequency of the oscillator that produces the carrier to be frequency modulated in modulator 23 is responsive to the bias voltage applied thereto so that, when transistor 27 is conductive, the portion of the video signals passed through filter 22 to modulator 23 causes the frequency of the carrier in modulator 23 to shift back and forth along the characteristic curve 29A (FIG. 5). By virtue of the linear operation of frequency modulator 23, characteristic curve 29A is shown as a straight line on FIG. 5. On the other hand, during each field interval when transistor 27 is non-conductive so as to change the bias voltage applied to frequency modulator 23, the frequency deviation of the carrier is frequency modulator 23 shifts back and forth along the characteristic curve 29B on FIG. 5.

As previously mentioned, the difference between the bias voltages applied to frequency modulator 23 when transistor 27 is alternately conductive and non-conductive, respectively, is such as to cause the corresponding carrier frequencies and the harmonics thereof to be in frequency interleaving relation to each other. Such frequency interleaving relation occurs when the first and second carrier frequencies employed during recording in the tracks 17A and 17B, respectively, differ from each other by $(m+\frac{1}{2})f_H$, in which m is a whole positive integer and $f_H$ is the line frequency or horizontal synchronizing signal frequency of the video signals. As a result of the foregoing, even if the same video signals are applied to input terminal 21 during the recording in two adjacent tracks, for example, the tracks 17A$_1$ and 17B$_1$ on FIG. 3, the frequencies of the signals recorded in such adjacent tracks 17A$_1$ and 17B$_1$ will differ from each other by $(m+\frac{1}{2})f_H$.

During reproduction of the frequency modulated signals recorded in the manner described above in one of the tracks 17, for example, in the track 17A$_2$ on FIG. 3, and assuming that each track has a small width for increasing the recording density, the reproducing head 12A will pick up the signals recorded in track 17A$_2$ and also, to some extent, the signals recorded in the next adjacent tracks 17B$_1$ and 17B$_2$ due to the abutting or partially overlapping relationship of the adjacent tracks. However, the frequency modulated signals reproduced from tracks 17B$_1$ and 17B$_2$, that is, the cross-talk signals, have a carrier frequency that differs by $(m+\frac{1}{2})f_H$ from the carrier frequency of the frequency modulated signals being simultaneously reproduced from the track 17A$_2$ scanned by head 12A, that is, the main or true reproduced signal. Thus, the frequency of the cross-talk signals is in frequency interleaving relation to the frequency of the main or true reproduced signal. Further, the effect of the cross-talk signals in the output of the reproducing head 12A or 12B is as if the frequency modulating signal of the main or true signal, that is, the signal which frequency modulates the carrier to constitute the main or true reproduced signal, was itself modulated with a signal having the frequency $(m+\frac{1}{2})f_H$. Accordingly, when the reproduced signals, that is the main or true signal and the cross-talk signals, are frequency demodulated, the demodulated signals will include the desired video signals and also an interfering or noise signal having the frequency $(m+\frac{1}{2})f_H$. By reason of such frequency of the interfering or noise signal, the latter will be inverted in phase in successive horizontal intervals of the video signals. Thus, when the demodulated signals are applied to a cathode ray tube, the interfering or noise signal due to cross-talk will visually cancel itself on the screen, and will not appear as a conspicuous noise or beat on the displayed image.

Figure 6:
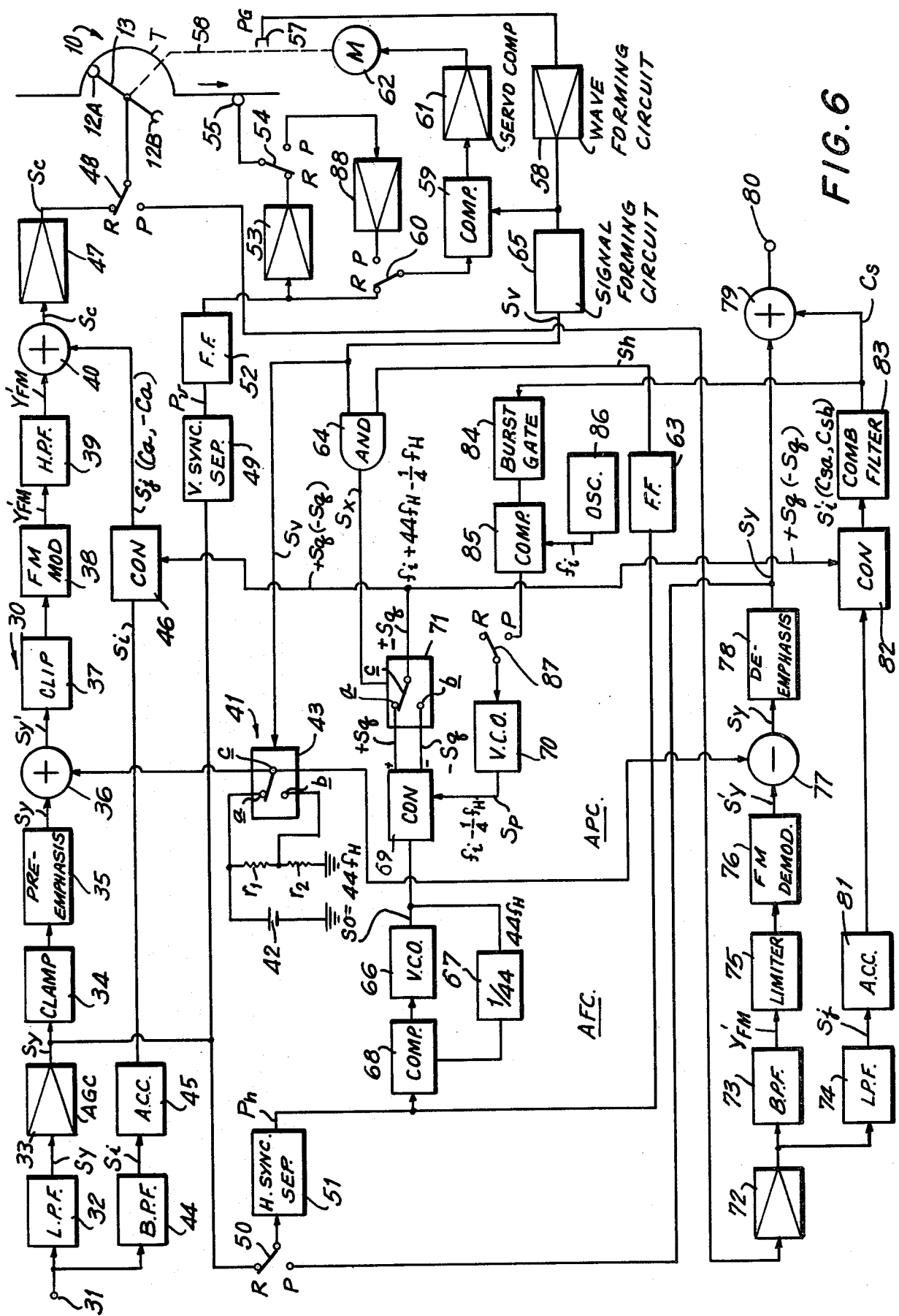
FIG. 6 is a schematic block diagram of a recording and/or reproducing apparatus according to an embodiment of this invention.

Referring now to FIG. 6, it will be seen that, in the recording section of an apparatus 30 according to this invention for recording and/or reproducing color video signals, an input terminal 31 is provided for receiving the color video signals which include luminance and chrominance components and are composed of line, field and frame intervals with blanking and synchronizing portions in each of those intervals. The color video signals are applied from input terminal 31 to a low pass filter 32 which transmits substantially only the luminance signal $S_Y$ to an automatic gain control amplifier 33. The gain controlled luminance component from amplifier 33 is applied to a clamp circuit 34 which clamps the luminance component to a fixed reference level in the usual way and supplies the clamped luminance component to a pre-emphasis circuit 35 in which the high frequency response of the luminance component is enhanced prior to being applied to an adding circuit 36. The output $S'_Y$ of adding circuit 36 is supplied to a clipping circuit 37 in which the overshooting and undershooting portions of the luminance component generated in pre-emphasis circuit 35 are eliminated or clipped. The clipped output of clipping circuit 37 is applied to a frequency modulator 38 for frequency modulating a suitably high frequency carrier in the latter. The frequency modulated luminance component $Y'_{FM}$ issuing from modulator 38 is passed through a high pass filter 39 to a mixing or adding circuit 40.

In accordance with this invention, the carrier frequency of the frequency modulated luminance component $Y'_{FM}$ issuing from modulator 38 is shifted between first and second carrier frequencies which are in frequency interleaving relation to each other, and such shifting of the carrier frequency is controlled so that the frequency modulated luminance component, as recorded in tracks which are next adjacent to each other, has the first and second carrier frequencies, respectively.

More particularly, in the apparatus 30 illustrated on FIG. 6, shifting of the carrier frequency of the frequency modulated luminance component $Y'_{FM}$ is effected by selectively applying to adding circuit 36 different first and second bias voltages to be added to luminance component $S_Y$ for correspondingly changing the bias or voltage level of the luminance component $S'_Y$ which is supplied through clipping circuit 37 to frequency modulator 38. In the apparatus 30, a circuit 41 for selectively applying the different first and second bias voltages to adding circuit 36 is shown to include a DC voltage source in the form of a battery 42, a voltage divider constituted by a series connection of resistors $r_1$ and $r_2$ in parallel with battery 42, and a switching circuit 43. The switching circuit 43 is schematically represented as having two fixed contacts a and b respectively connected to a junction between resistor $r_1$ and battery 42 and to a junction between resistors $r_1$ and $r_2$, and a movable contact c which alternatively engages fixed contacts a and b and which is connected to an input of adding circuit 36. The switching circuit 43 is controlled by a control signal $S_v$ which is suitably generated, as hereinafter described in detail, so as to apply a first control voltage to switching circuit 43 for causing movable contact c to engage fixed contact a during the scanning of a track on tape T by head 12A, and to apply a different control voltage to switching circuit 43 for causing movable contact c of the latter to engage fixed contact b during scanning of a track by head 12B.

Since it is convenient to record one field of the color video signals in each track on tape T, the control signal $S_v$ desirably causes change-over of movable contact c of switching circuit 43 from one to the other of the fixed contacts a and b during each vertical blanking period of the video signals. It will be apparent that, during the engagement of movable contact c with fixed contact a, a relatively high bias voltage is applied through switching circuit 43 to adding circuit 36 so as to correspondingly offset the bias level of the luminance component $S_Y$ then being applied to the adding circuit. On the other hand, during engagement of movable contact c with fixed contact b, a relatively lower bias voltage is applied through switching circuit 43 to adding circuit 36 for providing a correspondingly smaller offset to the bias level of the luminance component. The difference between the bias voltages applied to adding circuit 36 during engagement of movable contact c with fixed contacts a and b, respectively, is determined, for example, by suitable selection of the values of resistors $r_1$ and $r_2$, so as to be effective, in the frequency modulator 38, to establish the desired difference $(M+\frac{1}{2})f_H$ between the first and second carrier frequencies with which the frequency modulated luminance component $Y'_{FM}$ is recorded in alternating tracks on the tape T by the heads 12A and 12B, respectively.

The color video signals applied to input terminal 31 are also supplied from the latter to a band pass filter 44 which separates the chrominance component $S_i$ from the color video signals and passes the chrominance component through an automatic color control circuit 45 to a frequency converter 46 in which the chrominance component is converted to a frequency band lower than that of the frequency modulated luminance component $Y'_{FM}$ supplied to mixing circuit 40. The resulting frequency converted chrominance component $S_j$ is supplied from frequency converter 46 to another input of mixing circuit 40 so as to be combined, in the latter, with the frequency modulated luminance component $Y'_{FM}$ for providing a composite signal $S_c$ which is supplied through a recording amplifier 47 and a record terminal R of a record-playback switch 48 to the rotary heads 12A and 12B.

The luminance component $S_Y$ from automatic gain control circuit 33 is also shown to be supplied to a vertical sync separator 49 and, through a record terminal R of a record-playback switch 50, to a horizontal sync separator 51, so that separators 49 and 51 respectively separate vertical synchronizing signals $P_v$ and horizontal synchronizing signals $P_h$ from the luminance component. The separated vertical synchronizing signals $P_v$ are applied from separator 49 to a divider 52 which may be in the form of a flip-flop, as shown, and which is operative to provide control signals at a repetition rate which is a predetermined fraction ($\frac{1}{2} \times n$) of the repetition rate of the separated vertical synchronizing signals, in which n is the number of field intervals to be recorded in each of the tracks. In the case where one field interval is recorded in each of the tracks, the repetition rate of the control signals issuing from divider 52 is one-half the repetition rate of the vertical synchronizing signals, and the divider 52 may be constituted by a flip-flop, as shown. In any case, it will be appreciated that the control signals issuing from divider or flip-flop 52 occur in correspondence with the recording of color video signals in alternating or every other one of the tracks so as to identify or distinguish between the tracks in which the frequency modulated luminance component is recorded with first and second carrier frequencies and the chrominance component is recorded with first and second carriers, as hereinafter described in detail. The control signals from divider or flip-flop 52 are applied through an amplifier 53 and a record terminal R of a record-playback switch 54 to a fixed transducer or head 55 which is disposed adjacent a longitudinal edge portion of tape T for recording the control signals at suitably spaced apart locations along such longitudinal edge portion, as indicated at 56 on FIG. 3.

The control signals from divider or flip-flop 52 are also employed in a servo-system for regulating the movements of heads 12A and 12B relative to tape T. As shown, such servo-system may comprise pulse generating means 57 for producing pulse signals PG upon the operative positioning of one of the heads 12A and 12B relative to tape T, for example, generating means 57 may produce a pulse signal PG each time head 12A begins to scan a respective track on the tape. The pulse generating means 57 may conventionally include a magnet fixed on a drive shaft 58 by which the heads 12A and 12B are rotated, and a transducer or coil suitably located along the circular path of movement of such magnet so that, as head 12A commences to move along a track on tape T, the magnet on shaft 58 passes the coil of pulse generating means 57 and causes the latter to emit a pulse signal. The successive pulse signals from pulse generating means 57 are applied through a wave forming circuit 58 to a phase comparator 59 which also receives the control signals from divider or flip-flop 52 through a record terminal R of a record-playback switch 60. The comparator 59 compares the phases of the control signals from flip-flop 52 and of the pulse signals from generating means 57 and provides a corresponding brake control or servo signal which is passed through a servo amplifier 61 for either suitably decreasing or increasing the speed at which heads 12A and 12B are driven by a motor 62 connected with shaft 58 so that heads 12A and 12B will commence to move along respective tracks on tape T at the commencement of alternating field intervals of the color video signals being recorded.

The separated horizontal synchronizing signals $P_h$ are applied from separator 51 to a flip-flop 63 which produces a control signal $S_h$ applied to one input of an AND gate or circuit 64. The output of wave forming circuit 58 is also applied to a signal forming circuit 65 which produces the previously mentioned control signal $S_v$ applied to a signal forming circuit 65 which produces the previously mentioned control signal $S_v$ applied to switching circuit 43 and also applied to a second input of AND circuit 64.

Figure 7:
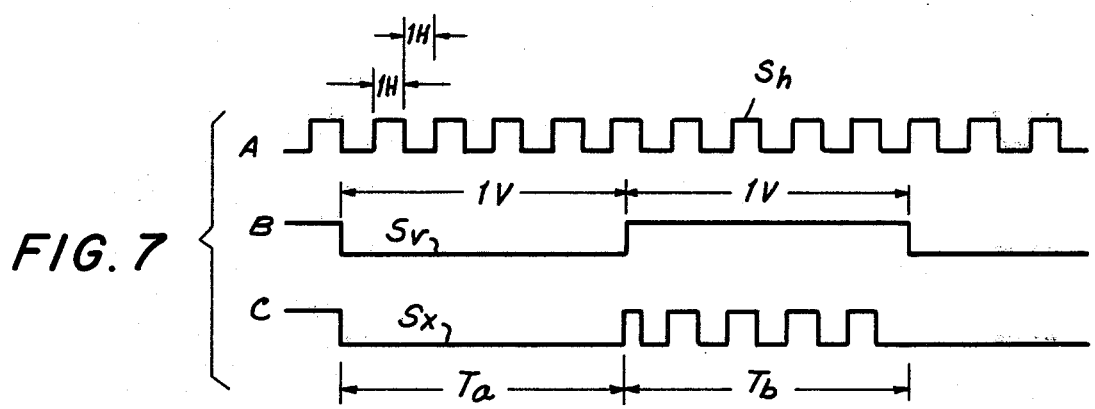
FIG. 7 shows a set of wave forms to which reference will be made in explaining the operation of a portion of the apparatus shown on FIG. 6.

Since the output or control signal $S_h$ from flip-flop 63 is shown at A on FIG. 7 to be a square wave having high and low intervals each equal to one line interval H, and the output or control signal $S_v$ from signal forming circuit 65 is shown at B on FIG. 7 to be a square wave having high and low intervals each equal to one field interval V, the output or control signal $S_x$ from AND circuit 64 remains low during one entire field interval $T_a$ and goes high only during alternate line intervals of the alternate field interval $T_b$, as shown at C on FIG. 7. In the illustrated recording and/or reproducing apparatus 30, such output or control signal $S_x$ from AND circuit 64 is employed for controlling the establishment of different carriers for the frequency converted chrominance component $S_j$ to be recorded in tracks that are next adjacent to each other, with such carriers differing from each other in their polarity characteristics as described in detail in U.S. Pat. Nos. 3,925,810, 4,007,482 and 4,007,484.

In the illustrated apparatus 30, the circuit for frequency converting the chrominance component $S_i$ and for providing the different carriers with which the frequency converted chrominance component $S_j$ is recorded in tracks that are next adjacent each other is shown to include a voltage controlled oscillator 66 providing an output $S_o$ with a center frequency of, for example $44f_H$. The output $S_o$ of oscillator 66 is applied to a divider 67 to be divided in the latter by 44, and the output of divider 67 is applied to a comparator 68 which also receives the separated horizontal synchronizing signals $P_h$ from separator 51. It will be appreciated that comparator 68 compares the frequency of the output from divider 67 with the frequency $f_H$ of the separated horizontal synchronizing signals $P_h$ and, upon any deviation therebetween, provides a suitable control voltage to voltage controlled oscillator 66 so that the frequency of the output $S_o$ is automatically controlled or maintained at $44 \times f_H$. The output $S_o$ of oscillator 66 is applied to a frequency converter 69 which may be in the form of a balanced modulator, and in which the output $S_o$ is frequency converted by a frequency converting signal $S_p$ from a voltage controlled oscillator 70 having a center frequency of $f_i - \frac{1}{4}f_H$, in which $f_i$ is the original or standard carrier frequency of the chrominance component $S_i$ of the color video signals being recorded. The balanced modulator or frequency converter 69 has two outputs ± of opposite polarity at which frequency converting signals $+S_q$ and $-S_q$, respectively, appear. Such frequency converting signals $+S_q$ and $-S_q$ are of opposite phase or polarity and have the frequency $(f_i + 44f_H - \frac{1}{4}f_H)$.

The frequency converting signals $+S_q$ and $-S_q$ are alternatively applied to frequency converter 46 through a switching circuit 71 which is schematically represented as having fixed contact a and b respectively connected to the ± outputs of balanced modulator 69 and a movable contact c which is alternately engageable with the fixed contact a and b and connected to frequency converter 46. Switching circuit 71 is controlled by the control signal $S_x$ from AND circuit 64 so that movable contact c of switching circuit 71 engages fixed contact a for applying frequency converting signal $+S_q$ to converter 46 whenever control signal $S_x$ has a low value, and for engaging movable contact c with fixed contact b and thereby applying frequency converting signal $-S_q$ to converter 46 whenever control signal $S_x$ has a high value. Frequency converting signals $+S_q$ and $-S_q$ alternately applied to frequency converter 46 are effective in the latter to convert the carrier of the chrominance component from its original carrier frequency $f_i$ to a relatively lower carrier frequency $f_c = 44f_H - \frac{1}{4}f_H$. As a result of the foregoing, the frequency converted chrominance component $S_j$ applied from frequency converter 46 to mixing circuit 40 has a frequency band lower than that of the frequency modulated luminance component $Y'_{FM}$. Further, during intervals when the frequency converting signal $-S_q$ is applied to frequency converter 46, the polarity or phase of the carrier of the frequency converted chrominance component $S_j$ is reversed as compared with the phase or polarity of such carrier during the intervals when the frequency converting signal $+S_q$ is applied to frequency converter 46.

It will also be noted that the carrier frequency $f_c$ of the frequency converted chrominance component $S_j$ satisfies the equation $$f_c = \tfrac{1}{2} f_H (2m - 1)$$

in which m is a whole positive integer. Of course, in the present case, in which $f_c = 44f_H - \frac{1}{4}f_H$, the value for m in the above equation is 88. As a result of the described selection of the carrier frequency of the frequency converted chrominance component $S_j$, the second harmonic of the carrier of the frequency converted chrominance component is interleaved with the luminance component so as to avoid beat interference therebetween. By avoiding such beat interference, the frequency converted chrominance component can be recorded with a relatively high amplitude in respect to the amplitude of the frequency modulated luminance component for obtaining a good signal-to-noise ratio of the chrominance component, as described in detail in U.S. Pat. No. 3,730,983, having a common assignee herewith. In any event, the frequency converted chrominance component $S_j$ and the frequency modulated luminance component $Y'_{FM}$ are combined in mixing circuit 40 with the frequency converted chrominance component $S_j$ amplitude modulating the frequency modulated luminance component $Y'_{FM}$ to provide the combined or composite signal $S_c$ which is applied through amplifier 47 and record-playback switch 48, in the record position of the latter, to heads 12A and 12B for recording by the latter in the successive parallel tracks on tape T.

The switches 48, 50, 54 and 60 are ganged or interconnected so as to be simultaneously changed-over from their recording positions shown on FIG. 6 to their reproducing or playback positions in which the movable contact of each of the enumerated switches engages a respective playback terminal or contact P. In the reproducing or playback section of apparatus 30, the playback terminal P of switch 48 is connected to a reproducing amplifier 72 so as to apply to the latter the signals being alternately reproduced by heads 12A and 12B from the successive parallel tracks on tape T. The output of reproducing amplifier 72 is connected to a band pass filter 73 and a low pass filter 74 which respectively separate the frequency modulated luminance component $Y'_{FM}$ and the frequency converted chrominance component $S_j$ from the reproduced signals. The frequency modulated luminance component $Y'_{FM}$ separated from the reproduced signals is passed through a limiter 75 to a frequency demodulator 76 so as to obtain a demodulated luminance component $S'_Y$. It will be noted that the demodulated luminance component $S'_Y$ obtained from demodulator 76 will have changes in the level thereof corresponding to the different carrier frequencies with which the frequency modulated luminance component $Y'_{FM}$ was recorded in the next adjacent tracks on tape T. In order to eliminate such changes in level of the demodulated luminance component $S'_Y$, the latter is applied to a subtracting circuit 77 which is also connected to the output of switching circuit 43 so as to alternately receive from the latter the previously described different first and second bias voltages. Such different first and second bias voltages are alternately subtracted from the demodulated luminance component $S'_Y$ in subtracting circuit 77 so as to obtain the reproduced luminance component $S_Y$ which is applied through a de-emphasis circuit 78 to a mixing or adding circuit 79 having it output connected to an output terminal 80.

The frequency converted chrominance component $S_j$ separated from the reproduced signals by filter 74 is applied through an automatic color control circuit 81 to a frequency reconverter 82 which alternately receives the frequency converting signals $+S_q$ and $-S_q$ from switching circuit 71, and by which the carrier of the reproduced chrominance component $S_j$ is reconverted to the original carrier frequency $f_i$. The resulting frequency reconverted chrominance component $S'_i$ is passed through a comb filter 83 in which, as hereinafter described in detail, chrominance components of cross-talk signals are cancelled or suppressed so that only the chrominance component $C_s$ of the video signals being reproduced from a particular track by the head 12A or 12B is passed to mixing circuit 79 for combining in the latter with the luminance component $S_y$ from de-emphasis circuit 78 and thereby forming the desired reproduced video signals applied to output terminal 80.

The output of comb filter 83 is also shown to be connected to a burst gate 84 which extracts burst signals from the reconverted chrominance signal component $S'_i$ and applies the extracted burst signals to one input of a phase comparator 85. An oscillator 86 provides an output at the standard or original carrier frequency $f_i$ for the chrominance component, and such output is applied to a second input of comparator circuit 85.

The output of phase comparator 85 is connected to a playback terminal P of a switch 87 which is also ganged or interconnected with the switches 48,50,54 and 60 so as to be effective, in the playback or reproducing mode of operation of apparatus 30, to apply the output of phase comparator 85, as a control voltage, to voltage controlled oscillator 70. It will be apparent that, in the reproducing mode of operation, any phase difference between the burst signals extracted by gate 84 from the reconverted chrominance component and the output of oscillator 86 causes comparator 85 to apply a suitable control voltage to voltage controlled oscillator 70 for effecting a required change in the phase of the converting signals $+S_q$ and $-S_q$, whereby to achieve an automatic phase control function for eliminating so-called jitter from a picture or image produced on a cathode ray tube in response to video signals obtained at output terminal 80.

In the reproducing mode of operation of apparatus 30, control signal $S_x$ for operating switching circuit 71 is again obtained from AND circuit 64 in response to the control signals $S_y$ and $S_h$ from signal forming circuit 65 and flip-flop 63, respectively. As before, the signal forming circuit 65 responds to the output of wave forming circuit 58 which, in turn, is responsive to the pulse signals PG from pulse generating means 57. However, in the reproducing or playback mode of operation of apparatus 30, the fixed head 55 reproduces the recorded control signals 56 which distinguish the tracks $17A_1$-$7A_4$ from the tracks $17B_1$-$17B_4$. The control signals reproduced by head 55 are applied through playback terminal P of switch 54 to an amplifier 88, and the output of the latter is applied through playback terminal P of switch 60 to comparator 59. Thus, comparator 59 compares the phase of the reproduced control signals 56 with the output of wave forming circuit 58 so as to provide a suitable servo control signal which is applied through servo amplifier 61 for controlling the rotation of heads 12A and 12B by motor 62. It will be apparent that the described servo control arrangement is effective, in the reproducing mode of operation, to ensure that each of the tracks on tape T will be scanned by the same head 12A or 12B which was employed for recording video signals in such track, and further to ensure that the control signal $S_y$ applied to AND circuit 64 will have the same relationship to the reproduced video signals as it had to the recorded video signals. In other words, if control signal $S_y$ has its low and high values during the recording of video signals by heads 12A and 12B, respectively, control signal $S_y$ will similarly have its low and high values during the reproducing of the signals by heads 12A and 12B, respectively. Further, it will be seen that the playback terminal of switch 50 is connected to the output of deemphasis circuit 78 so that, in the reproducing mode of operation, horizontal sync separator 51 will separate horizontal synchronizing signals from the reproduced luminance component $S_Y$ for controlling oscillator 66 and flip-flop 63.

The above described recording and/or reproducing apparatus 30 operates as follows:

RECORDING MODE OF OPERATION

In the recording mode of operation of apparatus 30, each of switches 48,50,54,60 and 87 is in its recording position so as to engage the respective recording terminal R, as shown on FIG. 6. In the recording operation of apparatus 30, the output of flip-flop 52 triggered by vertical synchronizing signals $P_v$ separated from the luminance component $S_Y$ of the color video signals applied to input terminal 31 is compared, in phase comparator 59, with the output of wave forming circuit 58 triggered by pulse signals PG from pulse generating means 57 so as to provide a suitable servo control signal by which the rotary movements of heads 12A and 12B are controlled for causing such heads 12A and 12B to commence the scanning of alternating tracks 17 on tape T at the commencement of respective field intervals of the color video signals.

During recording, the operation of switching circuit 43 is controlled by control signal $S_y$ from signal forming circuit 65 which is responsive to the output of wave forming circuit 58 so that circuit 41 applies different first and second bias voltages to adding circuit 36 during the field intervals of the incoming color video signals which are to be respectively recorded by the heads 12A and 12B. As previously mentioned, such first and second bias voltages, when added in circuit 36 to the chrominance component $S_Y$ separated from the incoming color video signals, are effective in frequency modulator 38 to establish the desired difference $(m+\frac{1}{2})f_H$ between the carrier frequencies with which the resulting frequency modulated luminance component $Y'_{FM}$ is recorded in alternating tracks on the tape T by the heads 12A and 12B, respectively. In other words, the frequency modulated luminance component $Y'_{FM}$ of the composite or combined signal $S_c$, as recorded by heads 12A and 12B in tracks which are next adjacent to each other on tape T, for example, in the tracks $17A_2$ and 17B₁ on FIG. 3, have different carrier frequencies which are in frequency interleaving relation to each other.

Further, during recording, the chrominance component $S_i$ separated from the incoming color video signals and having the original or standard carrier frequency $f_i$, is acted upon in frequency converter 46 by the frequency converting signal $+S_q$ or $-S_q$ so as to provide the frequency converted chrominance component $S_j$ with the reduced carrier frequency $f_c=44f_H-\frac{1}{2}f_H$. Thus, the frequency band of the frequency converted chrominance component $S_j$ is lower than that of the frequency modulated luminance component $Y_{FM}$ with which it is combined in mixing circuit 40 to constitute the composite or combined signal $S_c$ alternately recorded by heads 12A and 12B in the successive tracks on tape T. The alternative application of frequency converting signals $+S_q$ and $-S_q$ to frequency converter 46 is determined by switching circuit 71 which is, in turn, controlled by the control signal $S_x$ from AND circuit 64. Since frequency converting signals $+S_q$ and $-S_q$ are of opposite phase or polarity, the effect thereof in frequency converter 46 will be to provide the resulting frequency converted chrominance component $S_j$ with respective carriers $C_a$ and $-C_a$ which are similarly of opposed phase or polarity. As is apparent from wave form C on FIG. 7, control signal $S_x$ remains low during one entire field interval $T_a$, for example, during each field interval recorded by head 12A, and goes high only during alternate line intervals of the alternate field interval $T_b$, for example, each field interval recorded by the head 12B. Thus, during each field interval recorded by head 12A, frequency converting signal $+S_q$ is continuously applied to frequency converter 46 with the result that the successive line intervals of each field interval recorded by head 12A are provided with a carrier of the same polarity, for example, as indicated by the arrows shown in full lines on track 17A₂ of FIG. 3. On the other hand, during successive line intervals of each field interval recorded by head 12B, frequency converting signals $+S_q$ and $-S_q$ are alternately applied to frequency converter 46 so that the successive line intervals of each field interval recorded by head 12B are alternately recorded with the carriers $C_a$ and $-C_a$ of opposed polarity, for example, as indicated by the arrows in full lines on track 17B₁ of FIG. 3.

REPRODUCING MODE OF OPERATION

In the reproducing mode of operation of apparatus 30, switches 48, 50, 54, 60 and 87 are changed over to engage their respective reproducing or playback terminals P, with the result that the signals reproduced alternately by the heads 12A and 12B from the successive tracks on tape T are applied through switch 48 and reproducing aplifier 72 to filters 73 and 74 which respectively separate the frequency modulated luminance component $Y'_{FM}$ and the frequency converted chrominance component $S_j$ from the reproduced signals. In the reproducing or playback operation of apparatus 30, the rotation of heads 12A and 12B is regulated, on the basis of a comparison of the control signals 56 reproduced from the tape T by fixed head 55 with the pulse signals PG from pulse generating means 57, so that the signals recorded in respective tracks of tape T by heads 12A and 12B will be reproduced by such heads 12A and 12B, respectively. Further, as a result of such servo control of the rotation of heads 12A and 12B, the control signals $S_v$ from signal forming circuit 65 for controlling switching circuit 43 and the control signal $S_x$ from AND circuit 64 for controlling switching circuit 71 have the same relationships to the operative positioning of the heads 12A and 12B during the reproducing operation as during the recording operation.

In respect to the frequency modulated luminance component $Y'_{FM}$ separated from the reproduced signals, such luminance component is demodulated in frequency demodulator 76 so as to obtain the demodulated luminance component $S'_Y$ which, as previously noted, will have changes in the level thereof corresponding to the different carrier frequencies with which the frequency modulated luminance component $Y'_{FM}$ was recorded in the next adjacent tracks on tape T. However, by reason of the control of switching circuit 43 by control signal $S_v$, the different bias voltages subtracted from luminance component $S'_Y$ in subtracting circuit 77 are suitably selected so as to eliminate such changes in level and provide the desired reproduced luminance component $S_Y$ applied through deemphasis circuit 78 to mixing circuit 79. During reproducing operation, crosstalk or interference in respect to the luminance component of the video signals is eliminated partly by reason of the different azimuth angles with which the air gaps of heads 12A and 12B are preferably provided, and also by reason of the fact that the frequency modulated luminance component is recorded with different carrier frequencies in the adjacent tracks. Thus, as previously described, in the event that each of the tracks on tape T has a small width for increasing the recording density, in which case the azimuth loss is not sufficient to prevent cross-talk in respect to the frequency modulated luminance component reco4ded in adjacent tracks, the reproducing head 12A, for example, when scanning track 17A₂ will pick up the signals recorded in that track and also, to some extent, the signals recorded in the next adjacent track 17B₁. However, the frequency modulated luminance component reproduced by head 12A from track 17B₁, that is, the cross-talk luminance component, will have a carrier frequency that differs by $(m+\frac{1}{2})f_H$ from the carrier frequency of the frequency modulated luminance component being simultaneously reproduced from track 17A₂ being scanned by head 12A. Thus, the frequency of the cross-talk luminance component is in frequency interleaving relation to the frequency of the main or true reproduced luminance component.

As a result of the foregoing, and as previously described herein, when the frequency modulated luminance component separated from the reproduced signals is demodulated in frequency demodulator 76, the demodulated luminance component $S_Y$ will include the desired luminance component and also an interfering or noise signal having the frequency $(m+\frac{1}{2})f_H$ with the result that the interfering or noise signal will be inverted in phase in successive horizontal intervals of the video signals. Thus, when the reproduced video signals obtained at output terminal 80 are applied to a cathode ray tube, the interfering or noise signal due to luminance component cross talk will visually cancel itself on the screen of the cathode ray tube, and will not appear as a conspicuous noise or beat on the displayed image.

Figure 8A:
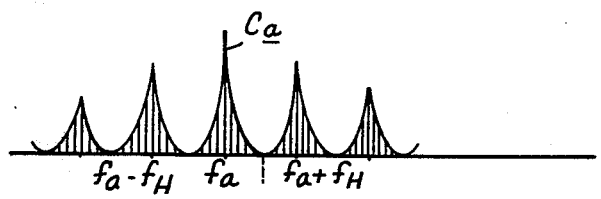
FIGS. 8A-8G show frequency spectra to which reference will be made in explaining the operation of the apparatus shown on FIG. 6.
Figure 8B:
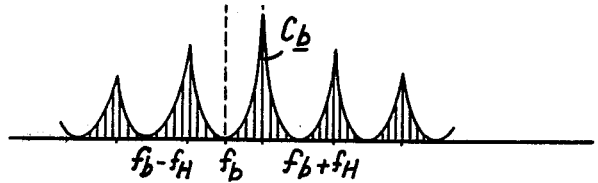

Considering the frequency converted chrominance component, it should be noted that the effect of providing the same with carriers $C_a$, $-C_a$ of reversed phase or polarity in successive line intervals or areas of each track recorded by head 12B is to provide a new carrier $C_b$ having frequency components (FIG. 8B) offset by ½$f_H$ with respect to the frequency components of the carrier $C_a$ (FIG. 8A) with which the frequency converted chrominance component is recorded in the next adjacent tracks by head 12A so as to interleave therewith, as described in detail in U.S. Pat. No. 3,925,810.

Figure 8C:
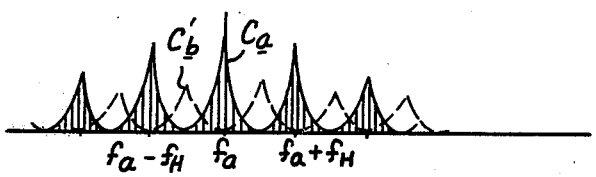
Figure 8D:
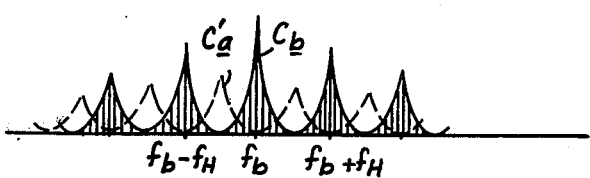

Accordingly, in the reproducing operation of apparatus 30, when, for example, head 12A scans track 17$A_2$ on tape T for reproducing the frequency converted chrominance component recorded therein with he carrier $C_a$, the undesired or cross-talk signal simultaneously reproduced by head 12A from the next adjacent track 17$B_1$ has its frequency converted chrominance component provided with a carrier in frequency interleaving relation to the carrier $C_a$, as indicated in broken lines at $C'_b$ on FIG. 8C. Similarly, whe, for example, head 12B scans track 17$B_1$ for reproducing the frequency converted chrominance component recorded therein with the carrier $C_b$, the undesired or cross-talk signal simultaneously reproduced by head 12B from the next adjacent track 17$A_2$ has its frequency converted chrominance component provided with a carrier in frequency interleaving relation to the carrier $C_b$, as indicated in broken lines at $C'_a$ on FIG. 8D.

Figure 8E:
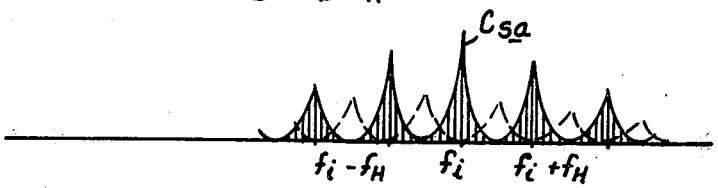
Figure 8F:
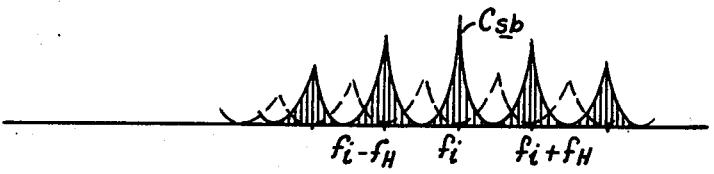
Figure 8G:
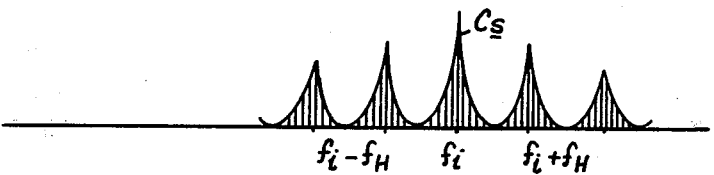

During the reproducing operation of apparatus 30, switching circuit 71 is again controlled by control signal $S_x$ from AND circuit 64 so that frequency reconverter 82 continuously receives the frequency converting signal +$S_q$ during the scanning of a track by head 12A, and so that frequency converting signals +$S_q$ and −$S_q$ are alternately applied to frequency reconverter 82 for successive line intervals during the scanning of a track by head 12B. As a result of the foregoing, during the scanning of a track by head 12A, frequency reconverter 82 reconverts the carrier $C_a$ of the chrominance component then being reproduced to a carrier $C_{sa}$ (FIG. 8E) having the original or standard carrier frequency $f_i$, while the carrier $C'_b$ of the cross-talk chrominance component has its frequency similarly shifted so as to be spaced midway between the principal side bands of the desired carrier $C_{sa}$, as shown in broken lines on FIG. 8E. Similarly, during the scanning of a track gy head 12B, frequency reconverter 82 frequency converts the carrier $C_b$ of the chrominance component being reproduced from such track to a carrier $C_{sb}$ (FIG. 8F) also having the original or standard frequency $f_i$, while the carrier $C'_a$ of the cross-talk chrominance component has its frequency similarly shifted so as to be spaced midway between the principal side bands of the desired carrier $C_{sb}$, as indicated in broken lines on FIG. 8F. Thus, the reconverted carriers $C_{sa}$ and $C_{sb}$ of the chrominance component reproduced during alternate field intervals both have the same carrier frequency $f_i$, while the chrominance component of the undesired or cross-talk signal is, in each case, spaced midway between the principal side bands of the desired carrier and can be eliminated by the comb filter 83 to yield the desired reconverted chrominance component $C_s$ which, as shown on FIG. 8G, is free of any cross-talk chrominance component.

It will be apparent from the above, that, in the described recording and/or reproducing apparatus 30 according to this invention, the reproduced color video signals obtained at output terminal 80 contain luminance and chrominance components that are both free of cross-talk even though the signals have been recorded without guard bands between successive parallel tracks on the tape T and even though such tracks have been provided with a very small width so as to attain a high recording density.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope or spirit of the invention as defined in the appended claims.

What is claimed is:

1. Apparatus for recording video signals in successive parallel tracks on a record medium, comprising
   modulating means for frequency modulating at least the luminance portion of said video signals on a carrier;
   means for shifting the carrier frequency of the frequency modulated portion of the video signals between different first and second carrier frequencies which are in frequency interleaving relation to each other, said shifting means including a bias voltage generating means operative to alternatively provide first and second different bias voltages by which said first and second carrier frequencies are respectively established; and
   means for controlling said shifting of the carrier frequency so as to record said frequency modulated portion of the video signals with said first and second carrier frequencies, respectively, in tracks which are next adjacent each other.

2. Apparatus according to claim 1; in which said first and second carrier frequencies differ from each other by $(m+\frac{1}{2})f_H$ in which m is a whole positive integer and $f_H$ is the horizontal synchronizing signal frequency of the video signals.

3. Apparatus according to claim 1; in which said video signals are color video signals further having a chrominance component; and
   further comprising means for frequency converting said chrominance component to a lower frequency band than that of the frequency modulated luminance portion, and means for combining the frequency converted chrominance component with the frequency modulated luminance portion to provide a composite signal for recording on the record medium.

4. Apparatus according to claim 3; in which said chrominance component of the color video signals has an original carrier frequency; and in which said means for frequency converting said chrominance component includes a frequency converter receiving said chrominance component with said original carrier frequency thereof, and means for producing a frequency converting signal supplied to said frequency converter for causing the latter to convert said original carrier frequency to a relatively lower carrier frequency.

5. Apparatus according to claim 4; in which said original and relatively lower carrier frequencies of the chrominance component are in frequency interleaving relation to each other and to the horizontal synchronizing signal frequency of the video signals.

6. Apparatus according to claim 5; in which said relatively lower carrier frequency has its second harmonic in frequency interleaving relation to said horizontal synchronizing signal frequency of the video signals.

7. Apparatus according to claim 6; in which said relatively lower carrier frequency of the frequency converted chrominance component is selected to satisfy the following equation:

$$f_c = \tfrac{1}{4} f_H (2m-1)$$

in which $f_C$ is said relatively lower carrier frequency, $f_H$ is said horizontal synchronizing signal frequency of the video signals, and m is a whole positive integer.

8. Apparatus according to claim 1; in which said record medium is magnetic, first and second magnetic transducers are provided for recording the video signals in said next adjacent tracks, respectively, and said first and second transducers have gaps with substantially different azimuth angles.

9. Apparatus according to claim 1; in which said video signals are color video signals comprised of field intervals and predetermined numbers of line intervals included in each field interval and being recorded in respective areas of said successive parallel tracks, and said color video signals additionally contain a chrominance component; and further comprising means for providing different first and second carriers for said chrominance component, carrier selecting means for alternatively selecting the first and second carriers for said chrominance signals to be recorded in the tracks, and control means for the carrier selecting means operative to cause the recording of said chrominance component with the first and second carriers therefor, respectively, in said tracks which are next adjacent each other.

10. Apparatus according to claim 9; in which said first and second carriers for the chrominance component have different polarity characteristics.

11. Apparatus according to claim 10; in which the polarity of said first carrier for the chrominance component is constant during successive line intervals of the video signals being recorded in one of the tracks, and the polarity of the second carrier for the chrominance component is reversed after each predetermined number of said line intervals of the video signals being recorded in the next adjacent track.

12. Apparatus according to claim 9; further comprising means for recording on the record medium control signals which are in predetermined positional relation to said tracks and which identify the tracks having video signals recorded therein with said first and second carriers, respectively.

13. Apparatus according to claim 9; in which the ends of the margins between successive areas in which said line intervals are recorded in each of said tracks are aligned, in the direction transverse to the lengths of the tracks, with the adjacent ends of the margins between the successive areas in which said line intervals are recorded in the next adjacent tracks.

14. Apparatus according to claim 1; in which said successive parallel tracks are arranged without guard bands therebetween.

15. Apparatus according to claim 1; in which said video signals are color video signals further containing a chrominance component having an original carrier frequency; and further comprising a frequency converter receiving said chrominance component with said original carrier frequency thereof, means for producing a frequency converting signal supplied to said frequency converter for causing the latter to convert said original carrier frequency of the chrominance component to a relatively lower carrier frequency so that a frequency converted chrominance component issuing from said frequency converter has a frequency band lower than that of the frequency modulated luminance portion, means for separating a horizontal synchronizing signal from said color video signals, means responsive to the separated horizontal synchronizing signal for maintaining said frequency converting signal at a predetermined frequency, and means for combining the frequency converted chrominance component with the frequency modulated luminance portion to provide a composite signal for recording on the record medium.

16. Apparatus according to claim 1; in which said bias voltage generating means selectively applies said first and second different bias voltages to said modulating means, with the difference between said first and second bias voltages being effective in said modulating means to establish said different first and second carrier frequencies.

17. Apparatus according to claim 16; in which said bias voltage generating means includes a voltage divider circuit having first and second resistive elements connected in series and a switching element connected in parallel with one of said resistive elements.

18. Apparatus according to claim 17; in which said first and second resistive elements are first and second resistors, respectively, and said switching element includes an NPN bi-polar junction transistor having an emitter-collector circuit connected in parallel with said one resistor.

19. Apparatus for recording video signals in successive parallel tracks on a record medium, comprising
modulating means for frequency modulating at least the luminance portion of said video signals on a carrier;
means for shifting the carrier frequency of the frequency modulated portion of the video signals between different first and second carrier frequencies which are in frequency interleaving relation to each other, said means for shifting the frequency of said carrier including means for selectively applying different first and second bias voltages to at least said luminance portion of the video signals as supplied to said modulating means, with the difference between said first and second bias voltages being effective in said modulating means to establish said different first and second carrier frequencies; and
means for controlling said shifting of the carrier frequency so as to record said frequency modulated portion of the video signals with said first and second carrier frequencies, respectively, in tracks which are next adjacent each other.

20. Apparatus according to claim 19; in which said first and second carrier frequencies differ from each other by $(m+\tfrac{1}{2})f_H$ in which m is a whole positive integer and $f_H$ is the horizontal synchronizing signal frequency of the video signals.

21. Apparatus according to claim 19; in which said video signals are color video signals further having a chrominance component; and
further comprising means for frequency converting said chrominance component to a lower frequency band than that of the frequency modulated luminance portion, and means for combining the frequency converted chrominance component with the frequency modulated luminance portion to provide a composite signal for recording on the record medium.

22. Apparatus according to claim 21; in which said chrominance component of the color video signals has an original carrier frequency; and in which said means for frequency converting said chrominance component includes a frequency converter receiving said chrominance component with said original carrier frequency thereof, and means for producing a frequency converting signal supplied to said frequency converter for causing the latter to convert said original carrier frequency to a relatively lower carrier frequency.

23. Apparatus according to claim 22; in which said original and relatively lower carrier frequencies of the chrominance component are in frequency interleaving relation to each other and to the horizontal synchronizing signal frequency of the video signals.

24. Apparatus according to claim 23; in which said relatively lower carrier frequency has its second harmonic in frequency interleaving relation to said horizontal synchronizing signal frequency of the video signals.

25. Apparatus according to claim 24; in which said relatively lower carrier frequency of the frequency converted chrominance component is selected to satisfy the following equation:

$$f_c = \tfrac{1}{4} f_H (2m-1)$$

in which $f_c$ is said relatively lower carrier frequency, $f_H$ is said horizontal synchronizing signal frequency of the video signals, and m is a whole positive integer.

26. Apparatus according to claim 19; in which said record medium is magnetic, first and second magnetic transducers are provided for recording the video signals in said next adjacent tracks, respectively, and said first and second transducers have gaps with substantially different azimuth angles.

27. Apparatus according to claim 19; in which said video signals are color video signals comprised of field intervals and predetermined numbers of line intervals included in each field interval and being recorded in respective areas of said successive parallel tracks, and said color video signals additionally contain a chrominance component; and further comprising means for providing different first and second carriers for said chrominance component, carrier selecting means for alternatively selecting the first and second carriers for said chrominance signals to be recorded in the tracks, and control means for the carrier selecting means operative to cause the recording of said chrominance component with the first and second carriers therefor, respectively, in said tracks which are next adjacent each other.

28. Apparatus according to claim 27; in which said first and second carriers for the chrominance component have different polarity characteristics.

29. Apparatus according to claim 28; in which the polarity of the first carrier for the chrominance component is constant during successive line intervals of the video signals being recorded in one of the tracks, and the polarity of the second carrier for the chrominance component is reversed after each predetermined number of said line intervals of the video signals being recorded in the next adjacent track.

30. Apparatus according to claim 27; further comprising means for recording on the record medium control signals which are in predetermined positional relation to said tracks and which identify the tracks having video signals recorded therein with said first and second carriers, respectively.

31. Apparatus according to claim 27; in which the ends of the margins between successive areas in which said line intervals are recorded in each of said tracks are aligned, in the direction transverse to the lengths of the tracks, with the adjacent ends of the margins between the successive areas in which said line intervals are recorded in the next adjacent tracks.

32. Apparatus according to claim 19; in which said successive parallel tracks are arranged without guard bands therebetween.

33. Apparatus according to claim 19; in which said video signals are color video signals further containing a chrominance component having an original carrier frequency; and further comprising a frequency converter receiving said chrominance component with said original carrier frequency thereof, means for producing a frequency converting signal supplied to said frequency converter for causing the latter to convert said original carrier frequency of the chrominance component to a relatively lower carrier frequency so that a frequency converted chrominance component issuing from said frequency converter has a frequency band lower than that of the frequency modulated luminance portion, means for separating a horizontal synchronizing signal from said color video signals, means responsive to the separated horizontal synchronizing signal for maintaining said frequency converting signal at a predetermined frequency, and means for combining the frequency converted chrominance component with the frequency modulated luminance portion to provide a composite signal for recording on the record medium.

34. Apparatus for recording and reproducing video signals in successive parallel tracks on a record medium, comprising a recording section including modulating means for frequency modulating at least the luminance portion of said video signals on a carrier, means for shifting the carrier frequency of the frequency modulated portion of the video signals between different first and second carrier frequencies which are in frequency interleaving relation to each other, and control means for controlling said shifting of the carrier frequency so as to record said frequency modulated portion of the video signals with said first and second carrier frequencies, respectively, in tracks which are next adjacent each other; and a reproducing section including demodulating means for frequency demodulating the frequency modulated portion of signals reproduced from the successive parallel tracks on the record medium, with the demodulated signal portion having changes in the level thereof corresponding to said different first and second carrier frequencies with which the frequency modulated portion of the video signals was recorded in the next adjacent tracks, respectively, and means for eliminating from the demodulated portion of the reproduced signals said changes in the level thereof.

35. Apparatus according to claim 34; in which said means for shifting the frequency of said carrier includes means for selectively adding different first and second bias voltages to said luminance portion of the video signals as supplied to said modulating means, with the difference between said first and second bias voltages being effective in said modulating means to establish said different first and second carrier frequencies; and in which said means for eliminating said changes in levels from the demodulated portion of the reproduced signals includes means for subtracting said different first and second bias voltages from said demodulated portion of the reproduced signals.

36. Apparatus according to claim 34; in which said first and second carrier frequencies differ from each other by $(m+\frac{1}{2})f_H$ in which m is a whole positive integer and $f_H$ is the horizontal synchronizing signal frequency of the video signals.

37. Apparatus according to claim 34; in which said video signals are color video signals further containing a chrominance component having an original carrier frequency; and in which said recording section further includes means for frequency converting said chrominance component to a lower frequency band than that of the frequency modulated luminance portion, and means for combining the frequency converted chrominance component with the frequency modulated luminance portion to provide a composite signal for recording on the record medium; and said reproducing section further includes means for individually separating the frequency modulated luminance portion and the frequency converted chrominance component from the reproduced composite signals, and means for frequency reconverting the separated frequency converted chrominance component back to said original carrier frequency therefor.

38. Apparatus according to claim 37; in which said means for frequency converting said chrominance component includes a frequency converter receiving said chrominance component with said original carrier frequency thereof, and means for producing a frequency converting signal supplied to said frequency converter for causing the latter to convert said original carrier frequency to a relatively lower carrier frequency; and in which said means for frequency reconverting the separated frequency converted chrominance component includes another frequency converter receiving said separated frequency converted chrominance component of the reproduced composite signals, and means for producing a frequency reconverting signal supplied to said other frequency converter for causing the latter to convert said relatively lower carrier frequency to said original carrier frequency.

39. Apparatus according to claim 39; in which said original and relatively lower carrier frequencies of the chrominance component are in frequency interleaving relation to each other and to the horizontal synchronizing signal frequency of the video signals.

40. Apparatus according to claim 39; in which said relatively lower carrier frequency has its second harmonic in frequency interleaving relation to said horizontal synchronizing signal frequency of the video signals.

41. Apparatus according to claim 40; in which said relatively lower carrier frequency of the frequency converted chrominance component is selected to satisfy the following equation:

$$f_c=\tfrac{1}{4}f_H(2m-1)$$

in which $f_C$ is said relatively lower carrier frequency, $f_H$ is said horizontal synchronizing signal frequency of the video signals, and m is a whole positive integer.

42. Apparatus according to claim 34; in which said record medium is magnetic, first and second magnetic transducers are provided for recording and reproducing the video signals in said next adjacent tracks, respectively, and said first and second transducers have gaps with substantially different azimuth angles.

43. Apparatus according to claim 34; in which said video signals are color video signals comprised of field intervals and predetermined numbers of line intervals included in each field interval and being recorded in respective areas of said successive parallel tracks, and said color video signals additionally contain a chrominance component; said recording section further includes means for providing different first and second carriers for said chrominance component, carrier selecting means for alternatively selecting the first and second carriers for said chrominance signals to be recorded in the tracks, and control means for the carrier selecting means operative to cause the recording of said chrominance component with the first and second carriers therefor, respectively, in said tracks which are next adjacent each other; and said reproducing section further includes transducer means for reproducing the frequency modulated luminance portion and the chrominance component recorded in each of the tracks along with cross-talk signals from tracks next adjacent thereto, and means for providing the chrominance component reproduced from each of said tracks with a common carrier and for eliminating the cross-talk signals therefrom on the basis of said different first and second carriers with which the chrominance component is recorded in the tracks which are next adjacent each other.

44. Apparatus according to claim 43; in which said means for eliminating the cross-talk signals includes a comb filter.

45. Apparatus according to claim 43; in which said first and second carriers for the chrominance component have different polarity characteristics.

46. Apparatus according to claim 45; in which the polarity of said first carrier for the chrominance component is constant during successive line intervals of the video signals being recorded in one of the tracks, and the polarlity of the second carrier for the chrominance component is reversed after each predetermined number of said line intervals of the video signals being recorded in the next adjacent track.

47. Apparatus according to claim 43; in which said recording section further comprises means for recording on the record medium control signals which are in predetermined positional relation to said tracks so as to identify the tracks having said luminance portion and chrominance component recorded therein with said first and second carrier frequencies and with said first and second carriers, respectively; said reproducing section further includes means for reproducing said control signals so as to identify the carrier frequency of the frequency modulated luminance portion and the carrier of the chrominance component then being reproduced by said transducer means; and said means for eliminating changes in level from the demodulated luminance portion and said means for providing the reproduced chrominance component with said common carrier are controlled on the basis of the reproduced control signals.

48. Apparatus according to claim 43; in which the ends of the margins between successive areas in which said line intervals are recorded in each of said tracks are aligned, in the direction transverse to the lengths of the tracks, with the adjacent ends of the margins between the successive areas in which said line intervals are recorded in the next adjacent tracks.

49. Apparatus according to claim 34; in which said successive parallel tracks are arranged without guard bands therebetween.

50. Apparatus according to claim 34; in which said video signals are color video signals further containing a chrominance component having an original carrier frequency; said recording section further includes a frequency converter receiving said chrominance component with said original carrier frequency thereof, means for producing a frequency converting signal supplied to said frequency converter for causing the latter to convert said original carrier frequency of the chrominance component to a relatively lower carrier frequency so that a frequency converted chrominance component issuing from said frequency converter has a frequency band lower than that of the frequency modulated luminance portion, and means for combining the frequency converted chrominance component with the frequency modulated luminance portion to provide composite signals for recording on the record medium; and said reproducing section includes another frequency converter receiving the frequency converted chrominance component of the reproduced composite signals and said frequency converting signal which, in said other frequency converter, causes the latter to reconvert said relatively lower carrier frequency to said original carrier frequency, and automatic phase control means for maintaining a predetermined phase relation between said frequency converting signal as applied to said other frequency converter and the carrier of the chrominance component which has had its carrier frequency reconverted to said original carrier frequency.

51. Apparatus according to claim 50; further comprising means selectively operative to separate a horizontal synchronizing signal from the luminance component of the color video signals in a recording operation and from the demodulated luminance portion of the reproduced composite signals in a reproducing operation, and automatic frequency control means for maintaining a predetermined relation between the frequency of said frequency converting signal and the frequency of the separated horizontal synchronizing signal.

52. Apparatus for reproducing video signals which are recorded in successive parallel tracks on a record medium with at least the luminance portion of the video signals, as recorded in tracks that are next adjacent to each other, being frequency modulated on a carrier which has different first and second carrier frequencies, respectively, and with such first and second carrier frequencies being in frequency interleaving relation to each other, comprising transducer means for scanning along said tracks one at a time so as to reproduce signals recorded therein;

demodulating means for frequency demodulating the frequency modulated portion of the signals reproduced from the successive parallel tracks on the record medium, with the demodulated signal portion having changes in the level thereof corresponding to said different first and second carrier frequencies with which the frequency modulated portion of the video signals was recorded in the next adjacent tracks, respectively; and means for eliminating from the demodulated portion of the reproduced signals said changes in the level thereof.

53. Apparatus according to claim 52; in which said means for eliminating the changes in level from the demodulated portion of the reproduced signal includes means for selectively subtracting different first and second bias voltages from said demodulated portion of the reproduced signals, with the difference between said first and second bias voltages being equivalent to a change in level exhibited by said demodulating means in response to the difference between said first and second carrier frequencies.

54. Apparatus according to claim 52; in which said video signals are color video signals further containing a chrominance component having an original carrier frequency, and said chrominance component is frequency converted to a lower frequency band than that of the frequency modulated luminance portion and then combined with the latter to provide composite signals which are recorded in the successive parallel tracks; and further comprising means for individually separating the frequency modulated luminance portion and the frequency converted chrominance component from the reproduced composite signals, and means for frequency reconverting the separated frequency converted chrominance component back to said original carrier frequency therefor.

55. Apparatus according to claim 54; in which said means for frequency reconverting the separated frequency converted chrominance component includes a frequency converter receiving said separated frequency converted chrominance component of the reproduced composite signals, and means for producing a frequency reconverting signal supplied to said frequency converter for causing the latter to convert said relatively lower carrier frequency to said original carrier frequency.

56. Apparatus according to claim 55; in which said original and relatively lower carrier frequencies of the chrominance component are in frequency interleaving relation to each other and to the horizontal synchronizing signal frequency of the video signals.

57. Apparatus according to claim 56; in which said relatively lower carrier frequency has its second harmonic in frequency interleaving relation to said horizontal synchronizing signal frequency of the video signals.

58. Apparatus according to claim 57; in which said relatively lower carrier frequency of the frequency converted chrominance component is selected to satisfy the following equation:

$$f_c = \tfrac{1}{4} f_H (2m - 1)$$

in which $f_c$ is said relatively lower carrier frequency, $f_H$ is said horizontal synchronizing signal frequency of the video signals, and m is a whole positive integer.

59. Apparatus according to claim 54; in which the record medium is magnetic, and the next adjacent tracks have the composite signals magnetically recorded therein with different azimuths; and in which said transducer means includes first and second magnetic transducers having gaps with different azimuths corresponding to the azimuths of the signals recorded in the next adjacent tracks and respectively reproducing the signals recorded in the latter.

60. Apparatus according to claim 52; in which said video signals are color video signals comprised of field intervals and predetermined numbers of line intervals included in each field interval and being recorded in respective areas of said successive parallel tracks, and said color video signals additionally contain a chrominance component which is recorded in said next adjacent tracks with different first and second carriers, respectively, so that said transducer means, in scanning each of said tracks, reproduces the frequency modulated luminance portion and the chrominance component recorded in the track being scanned along with cross-talk signals from tracks next adjacent thereto; and further comprising means for producing the chrominance component reproduced from each of said tracks with a common carrier and for eliminating the cross-talk signals therefrom on the basis of said different first and second carriers with which the chrominance component is recorded in the tracks which are next adjacent each other.

61. Apparatus according to claim 60; in which said means for eliminating the cross-talk signals includes a comb filter.

62. Apparatus according to claim 60; in which said first and second carriers for the chrominance component have different polarity characteristics.

63. Apparatus according to claim 62; in which the polarity of said first carrier for the chrominance component is constant during successive line intervals of the video signals recorded in the respective one of said next adjacent tracks, and the polarity of the second carrier for the chrominance component is reversed after each predetermined number of said line intervals of the video signals being recorded in the other of said next adjacent tracks.

64. Apparatus according to claim 60; in which said record medium further has control signals recorded thereon in predetermined positional relation to said tracks so as to identify the tracks having said luminance and chrominance components recorded therein with said first and second carrier frequencies and with said first and second carriers, respectively; means are provided for reproducing said control signals so as to identify the carrier frequency of the frequency modulated luminance portion and the carrier of the chrominance component then being reproduced by said transducer means; and said means for eliminating changes in level from the demodulated luminance portion and said means for providing the reproduced chrominance component with said common carrier are controlled on the basis of the reproduced control signals.

65. Apparatus according to claim 60; in which the ends of the margins between successive areas in which said line intervals are recorded in each of said tracks are aligned, in the direction transverse to the lengths of the tracks, with the adjacent ends of the margins between the successive areas in which said line intervals are recorded in the next adjacent tracks.

66. Apparatus according to claim 52; in which said successive parallel tracks are arranged without guard bands therebetween on the record medium.

67. Apparatus according to claim 52; in which said video signals are color video signals further containing a chrominance component having an original carrier frequency, and said chrominance component is frequency converted to a lower frequency band than that of the frequency modulated luminance portion and then combined with the latter to provide composite signals which are recorded in said successive parallel tracks; and further comprising means for individually separating the frequency modulated luminance portion and the frequency converted chrominance component from the reproduced composite signals, a frequency converter receiving said separated frequency converted chrominance component of the reproduced composite signals, means for producing a frequency reconverting signal supplied to said other frequency converter for causing the latter to reconvert said relatively lower carrier frequency to said original carrier frequency, and automatic phase control means for maintaining a predetermined phase relation between said frequency converting signal as applied to said frequency converter and the carrier of the chrominance component which has had its carrier frequency reconverted to said original carrier frequency.

68. Apparatus according to claim 67; further comprising means operative to separate a horizontal synchronizing signal from the demodulated luminance portion of the reproduced composite signals, and automatic frequency control means for maintaining a predetermined relation between the frequency of said frequency converting signal and the frequency of the separated horizontal synchronizing signal.

* * * * *